(12) United States Patent
Chen et al.

(10) Patent No.: US 11,860,506 B2
(45) Date of Patent: Jan. 2, 2024

(54) VIRTUAL REALITY DISPLAY SYSTEM AND HEAD-MOUNTED DISPLAY APPARATUS

(71) Applicants: Interface Technology (ChengDu) Co., Ltd., Chengdu (CN); INTERFACE OPTOELECTRONICS (SHENZHEN) CO., LTD., Shenzhen (CN); INTERFACE OPTOELECTRONICS (WUXI) CO., LTD., Wuxi (CN); GENERAL INTERFACE SOLUTION LIMITED, Zhunan (TW)

(72) Inventors: Po-Lun Chen, Zhunan (TW); Yun-Pei Chen, New Taipei (TW); Che-Wen Chiang, New Taipei (TW); Wei-Hung Tsay, Taipei (TW)

(73) Assignees: Interface Technology (ChengDu) Co., Ltd., Chengdu (CN); INTERFACE OPTOELECTRONICS (SHENZHEN) CO., LTD., Shenzhen (CN); INTERFACE OPTOELECTRONICS (WUXI) CO., LTD., Wuxi (CN); GENERAL INTERFACE SOLUTION LIMITED, Zhunan (TW)

(*) Notice: Subject to any disclaimer, the term of this patent is extended or adjusted under 35 U.S.C. 154(b) by 0 days.

(21) Appl. No.: 17/890,468

(22) Filed: Aug. 18, 2022

(65) Prior Publication Data
US 2023/0350267 A1    Nov. 2, 2023

(30) Foreign Application Priority Data
Apr. 29, 2022   (CN) .......................... 202210465052.0

(51) Int. Cl.
*G02F 1/29* (2006.01)
*G06F 1/16* (2006.01)

(52) U.S. Cl.
CPC .............. *G02F 1/294* (2021.01); *G06F 1/163* (2013.01)

(58) Field of Classification Search
CPC ...................................................... G02F 1/294
See application file for complete search history.

(56) References Cited

U.S. PATENT DOCUMENTS

| | | | |
|---|---|---|---|
| 10,778,963 B2 * | 9/2020 | Hudman | G02F 1/1334 |
| 10,928,695 B1 * | 2/2021 | Chen | G02F 1/133723 |
| 11,567,326 B1 * | 1/2023 | Jamali | G02F 1/134309 |
| 2017/0235187 A1 * | 8/2017 | Jung | G02F 1/13 348/369 |

\* cited by examiner

*Primary Examiner* — Edmond C Lau
(74) *Attorney, Agent, or Firm* — ScienBiziP, P.C.

(57) ABSTRACT

A virtual reality display system of reduced size and depth but with a point of focus electronically changeable to suit different human eyes includes a display device and a focusing structure. The display device emits light for images, the focusing structure on the light path includes a first electrode layer, a second electrode layer, and a first liquid crystal layer between the first electrode layer and the second electrode layer, these two electrode layers receiving different voltages. The first liquid crystal layer is configured to converge the image light as necessary for the viewer and enlarge images as desired by the viewer. The image light after being focused displays a virtual reality image.

9 Claims, 8 Drawing Sheets

VIRTUAL REALITY DISPLAY SYSTEM AND HEAD-MOUNTED DISPLAY APPARATUS

FIELD

The present disclosure generally relates to virtual reality display technology, particularly relates to a virtual reality display system and a head-mounted display apparatus including the virtual reality display system.

BACKGROUND

Virtual reality (VR) technology has developed rapidly in many fields. Intelligent devices applying VR technology include head-mounted displays (HMDs).

A HMD includes a display device and optical assembly. The display device emits light for images, and the optical assembly is on a light path of the image light. The optical assembly is used to modulate the image light and guide the modulated image light to human eye. In order to adapt to different conditions (myopia, hyperopia, etc.) of the human eyes, the optical assembly is also configured to adjust a focus of the image light so that clear images can be seen by human eyes. Conventional focusing methods include focusing by micro lens array, focusing by curved reflector group, etc. The conventional focusing methods need more optical elements and have a long optical path, which does not allow the HMD to be smaller and thinner.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

"Above" means one layer is located on top of another layer. In one example, it means one layer is situated directly on top of another layer. In another example, it means one layer is situated over the second layer directly or indirectly with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or an intervening features or elements may be present.

First Embodiment

Figure 1:
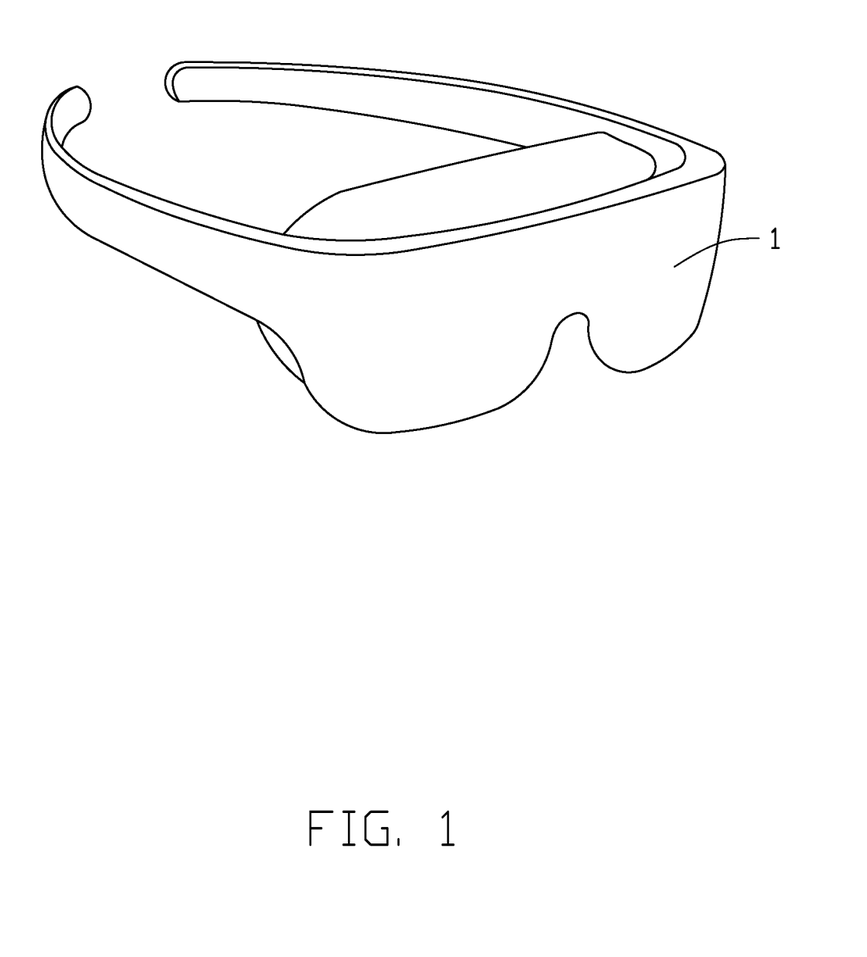
FIG. 1 shows a head-mounted display apparatus of a first embodiment of the present disclosure.

A head-mounted display device 1 of this embodiment of the present disclosure is shown in FIG. 1. Users can observe VR images by wearing the head-mounted display device 1 on their head.

Figure 2:
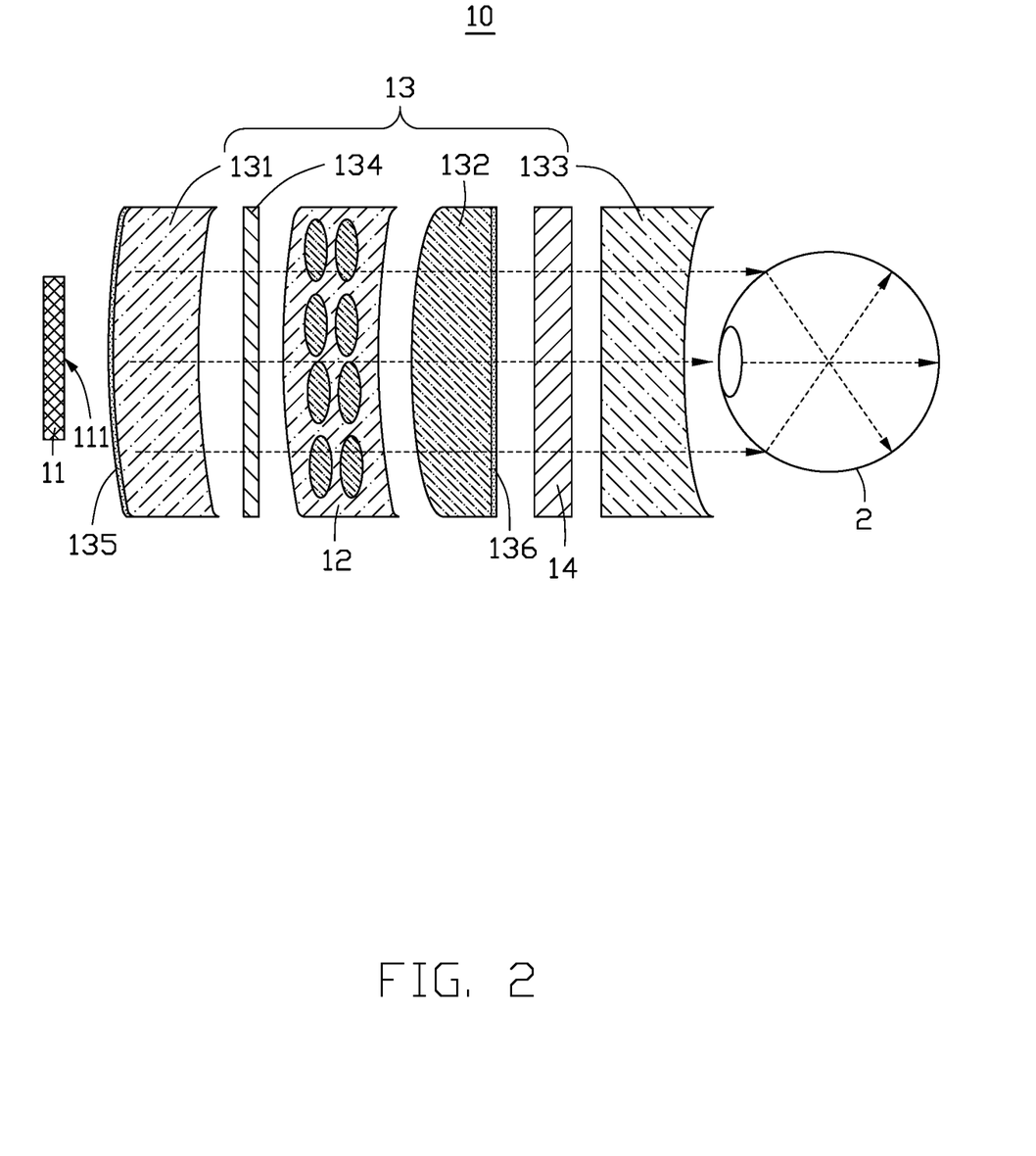
FIG. 2 shows an optical path of a VR display system of the head-mounted display apparatus.

In this embodiment, the head-mounted display device 1 includes two VR display systems 10 as shown in FIG. 2. Each VR display system 10 is used to emit light representing an image taken as a VR image by a human eye 2. In this embodiment, optical paths of the image light from the two VR display systems 10 in the head-mounted display device 1 are independent from each other, displaying VR images for a left eye and a right eye of the user. In this embodiment, the head-mounted display device 1 further includes a control device (not shown) electrically connecting to each VR display system 10.

In this embodiment, structures and working principle of the two VR display systems 10 are basically the same. The following will take one of the two VR display systems 10 as an example.

As shown in FIG. 2, the VR display system 10 includes a display device 11 and a focusing structure 12. The display device 11 has a display surface 111 for emitting the image light. In this embodiment, the display device 11 may be a light emitting diode display device. The control device electrically connected to the focusing structure 12 to control a process of focusing of the focusing structure 12.

Figure 3:
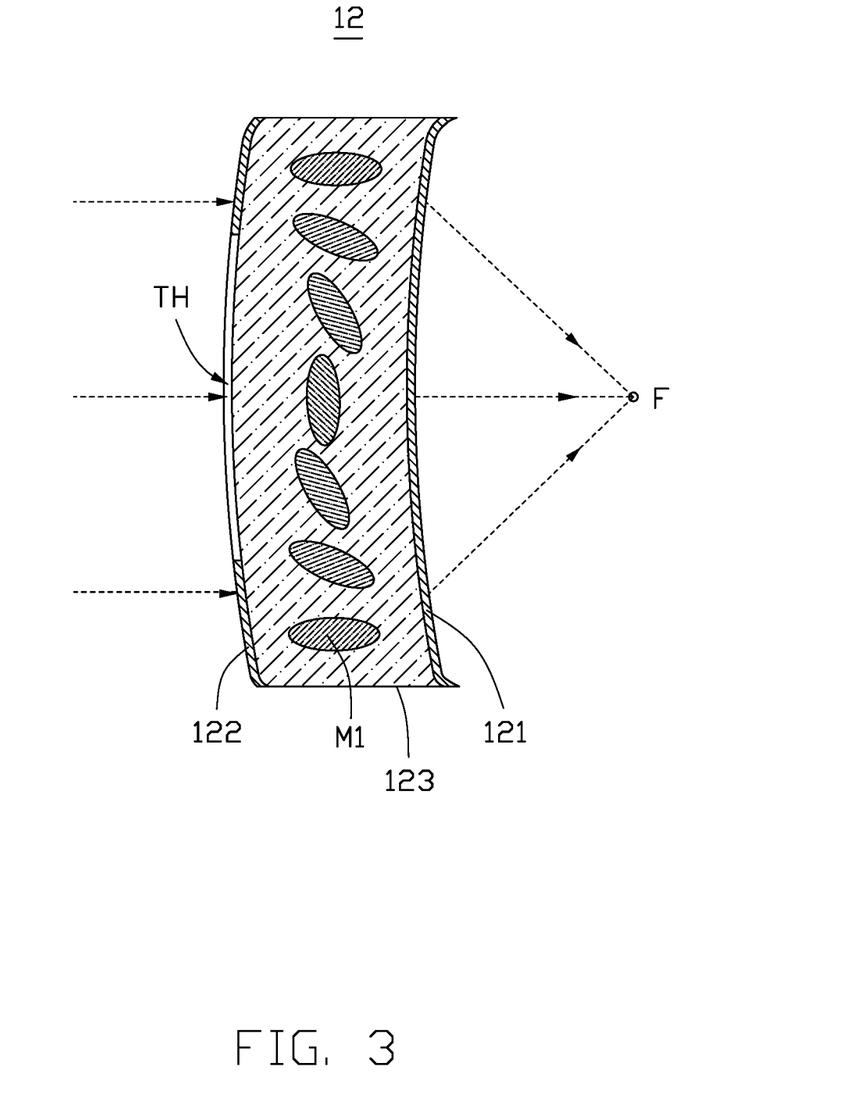
FIG. 3 shows image light taken in by focusing structure in FIG. 2.

As shown in FIG. 3, the focusing structure 12 is on the optical path of the image light. The focusing structure 12 includes a first electrode layer 121, a second electrode layer 122, and a first liquid crystal layer 123 between the first electrode layer 121 and the second electrode layer 122. The first liquid crystal layer 123 includes a plurality of liquid crystal molecules M1. Both the first electrode layer 121 and the second electrode layer 122 are connected to the control device to receive voltage as signals from the control device. A voltage difference is formed between the first electrode layer 121 and the second electrode layer 122 when the voltages applied to the first electrode layer 121 and the second electrode layer 122 are different, thereby an electric field is formed between the first electrode layer 121 and the second electrode layer 122. The first liquid crystal layer 123 is in the electric field and the liquid crystal molecules M1 in the first liquid crystal layer 123 are thus controlled to rotate according to the electric field.

Specifically, by adjusting the voltages on the first electrode layer 121 and/or the second electrode layer 122, the voltage difference between the first electrode layer 121 and the second electrode layer 122 can be adjusted, thereby adjusting an intensity and a direction of the electric field. A rotation angle of each liquid crystal molecule M1 can be adjusted by adjusting the intensity and direction of the electric field. A direction in which the image light exits from the focusing structure 12 will change when the rotation angles of the liquid crystal molecules M1 are changed, when the image light passes through the focusing structure 12. Therefore, by adjusting the voltage difference between the first electrode layer 121 and the second electrode layer 122, the direction in which the image light is emitted from the focusing structure 12 can be adjusted, thereby adjusting a position of the point of focus of the image light.

The first electrode layer 121 is sheet-like, and is conductive and continuous, and the second electrode layer 122 is sheet-like and conductive, with a through hole TH in a central region. The first electrode layer 121 is on a light exiting side of the focusing structure 12, and the second electrode layer 122 is on a light entering side of the focusing structure 12.

A region of the first liquid crystal layer 123 having hole TH is defined as a first region, and a region of the first liquid crystal layer 123 corresponding to the second electrode layer 122 is defined as a second region. When voltages are applied to the first electrode layer 121 and the second electrode layer 122, an electric field is formed therebetween orthogonal to the regions of the first and second electrode layers 121 and 122. The liquid crystal molecules M1 in the second region of the first liquid crystal layer 123 are controlled to rotate according to the electric field. The liquid crystal molecules M1 in the first region of the first liquid crystal layer 123 may also affected to a certain extent by the electric field, the closer the liquid crystal molecules M1 are to the second region, the greater the effect of the electric field and the larger (the stronger) the rotation angle. The liquid crystal molecules M1 at the center of the first region directly opposite hole TH of the second region are not affected by an electric field, do not rotate, and do not affect the direction of the image light.

The rotation angles of the liquid crystal molecules M1 in the first liquid crystal layer 123 gradually changes from the center to the periphery, and light emitted from the region other than the central region of the first liquid crystal layer 123 can be controlled to be deflected toward the central region, thereby converging on focus F of the focusing structure 12. In this embodiment, the through hole TH is circular, the central region of the second electrode layer 122 referring to the circular region centered on the geometric center point of the second electrode layer 122. The central region of the first liquid crystal layer 123 is defined in the same manner.

According to the structure of the focusing structure 12, the direction of the image light emitted from the central area of the first liquid crystal layer 123 is unchanged, but the image light emitted from other areas of the first liquid crystal layer 123 is deflected toward the central area so that the image light emitted from the focusing structure 12 finally converges at the focal point F of the focusing structure 12. The focusing structure 12 has the same effect on the image light in this embodiment as a lens. Compared with a conventional lens, a focal length of the focusing structure 12 in this embodiment is not fixed and invariable, but can be changed by changing the voltages on the first electrode layer 121 and the second electrode layer 122.

Therefore, the focal length of the focusing structure 12 of this embodiment is adjustable, so that the image light can be converged to different depths or positions after passing through the focusing structure, to meet different needs of the human eye (myopia, hyperopia, or presbyopia).

In at least one embodiment of the present disclosure, users can manually adjust the focal length of the focusing structure 12 by keys, by touch, etc., until a clear image is observed. In at least one embodiment, the head-mounted display apparatus 1 may further include an eye tracking system (not shown in the figure). The eye tracking system may feedback a signal from a sensor to the control device by tracking the user's eye, so that the control device outputs a voltage to the first electrode layer and the second electrode layer in the focusing structure 12, so that the focal length of the focusing structure 12 can constantly meet the needs of the human eye, this is called an automatic focusing.

In this embodiment, the image displayed by the image light from the display surface 111 has a small size because the display device 11 has a small size. The image displayed by the image light needs to be enlarged before being guided to the human eye 2. As shown in FIG. 2, in this embodiment, the VR display system 10 further includes an enlargement assembly 13 for producing enlarged images.

In this embodiment, the enlargement assembly 13 includes a wave plate 134 and a lens group including a plurality of lenses, such as a lens 131, a lens 132, and a lens 133. The lens 131, the lens 132, and the lens 133 are collectively focus the image light. The wave plate 134 is among the lenses in the lens group and converts a polarization state of the image light received. In this embodiment, the lens 131, the wave plate 134, the lens 132, and the lens 133 are sequentially arranged on the optical path of the image light. When a user wears the head-mounted display device 1, the lens 131 is farthest from the human eye 2 and the lens 133 is closest to the human eye 2.

In this embodiment, the lens 131, the lens 132, and the lens 133 are aspheric lenses, wherein the lens 131 is concave on the side closer to the eye and convex on the further side. A surface of the lens 131 facing the display device 11 is plated with a semi-reflective and semi-transparent coating 135, the lens 132 is a plano-convex lens, the lens 133 is a plano-concave lens, and a surface of the lens 133 away from the display device 11 is coated with a polarizing reflection film 136. The present disclosure does not limit a number and structure of the lenses, as long as the lens group can achieve enlargement of images.

An optical system usually needs many optical elements and a long optical path to enlarge an image. In this embodiment, in order to reduce a size of the head-mounted display apparatus 1, the image light is made to travel back and forth in the lens group by the wave plate 134 converting the polarization state of the image light and the functional coating (semi-reflective and semi-transparent coating 135 and polarization reflective film 136), thereby extending the optical path of the image light in a very limited space, this achieves enlargement of images and miniaturization of the head-mounted display apparatus 1 at the same time.

Specifically, in this embodiment, the wave plate 134 is a quarter wave plate, and the image light from the display device 11 is a left-handed circularly polarized light. The image light is converted into a horizontally linearly polarized light after passing through the wave plate 134. The polarization reflection film 136 is used to reflect the horizontally polarized light, and the image light is guided to the wave plate 134 again and converted into a right-handed circularly polarized light. The image light is transmitted from the wave plate 134 and passes through the lens 131 again. Since a surface of the lens 131 near the display device 11 is provided with the semi-reflective and semi-transparent coating 135, a part of the image light will be reflected again to the wave plate 134 and converted into a vertically linearly polarized light. The polarization reflection film 136 is used to transmit the vertically linearly polarized light received to the lens 133. Thus, the image light passes through the enlargement assembly 13 three times and is then transmitted from the enlargement assembly 13 to the human eye 2.

In this embodiment, the focusing structure 12 is between the wave plate 134 and the lens 132. In other embodiments, the focusing structure 12 may be in other positions, for example, the focusing structure 12 may be on a side of the lens 133 away from the display device 11. Since the liquid crystal molecules M1 in the focusing structure 12 only act on linearly polarized light, the focusing structure 12 needs to be placed in a position that receives image light in a linearly polarized state.

The focusing structure 12 of this embodiment includes a first liquid crystal layer 123, which must be a thin film so that the entire depth of the focusing structure 12 is small and the structure 12 can be placed between two adjacent lenses in the lens group. Therefore, the focusing structure 12 of this embodiment is particularly applicable to the case where the VR display system 10 includes a lens group.

As shown in FIG. 2, in this embodiment, the VR display system 10 further includes a polarizing element 14. The polarizing element 14 is on the optical path of the image light and is used to transmit a part of the image light and filter out other part of the image light. In this embodiment, the polarizing element 14 is a polarizing plate for transmitting image light having the same polarization direction with the polarizing element 14 and absorbing image light having a different polarization direction.

In this embodiment, the polarization directions of the polarizing elements 14 of the two VR display systems 10 are different. That is, the polarization directions of the image light incident on the left and right eyes of the users are different, which enables the head-mounted display apparatus 1 to display a three-dimensional VR image to the users.

Figure 4:
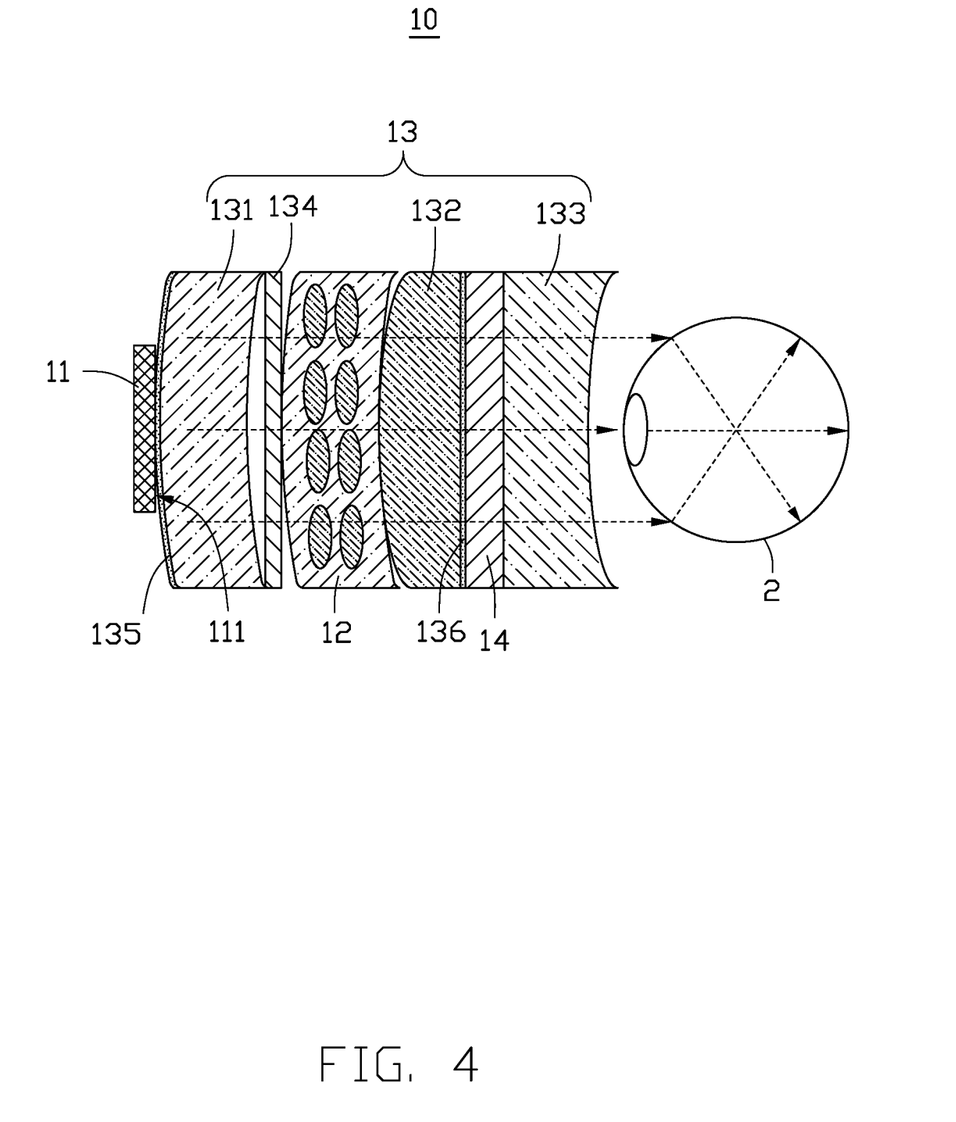
FIG. 4 shows a structure of the VR display system in FIG. 2.

A structure of the VR display system 10 of this embodiment is shown in FIG. 4. In a manufacturing process, the lens 131 coated with the semi-reflective and semi-transparent coating 135 is bonded to the wave plate 134, the lens 132 coated with the polarization reflective film 136 is bonded to the focusing structure 12, the wave plate 134 is bonded to the focusing structure 12, and finally the polarizing element 14 and the lens 133 are bonded.

The head-mounted display apparatus 1 and the VR display system 10 of this embodiment include a display device 11 and a focusing structure 12, wherein the focusing structure 12 includes a first electrode layer 121, a second electrode layer 122, and a first liquid crystal layer 123 between the first electrode layer 121 and the second electrode layer 122. By adjusting the voltages on the first electrode layer 121 and the second electrode layer 122, the rotation angles of the liquid crystal molecules M1 in the first liquid crystal layer 123 can be adjusted, thereby adjusting the focal length of the focusing structure 12. That is, the focal length of the focusing structure 12 in this disclosure is adjustable. Compared with the conventional lens, it is adaptable to different needs of the human eye. The first liquid crystal layer 123 is thinner compared with the conventional focusing structure. The focusing structure 12 in this embodiment is particularly suitable for a case where the VR display system 10 includes a lens group.

Second Embodiment

Figure 5:
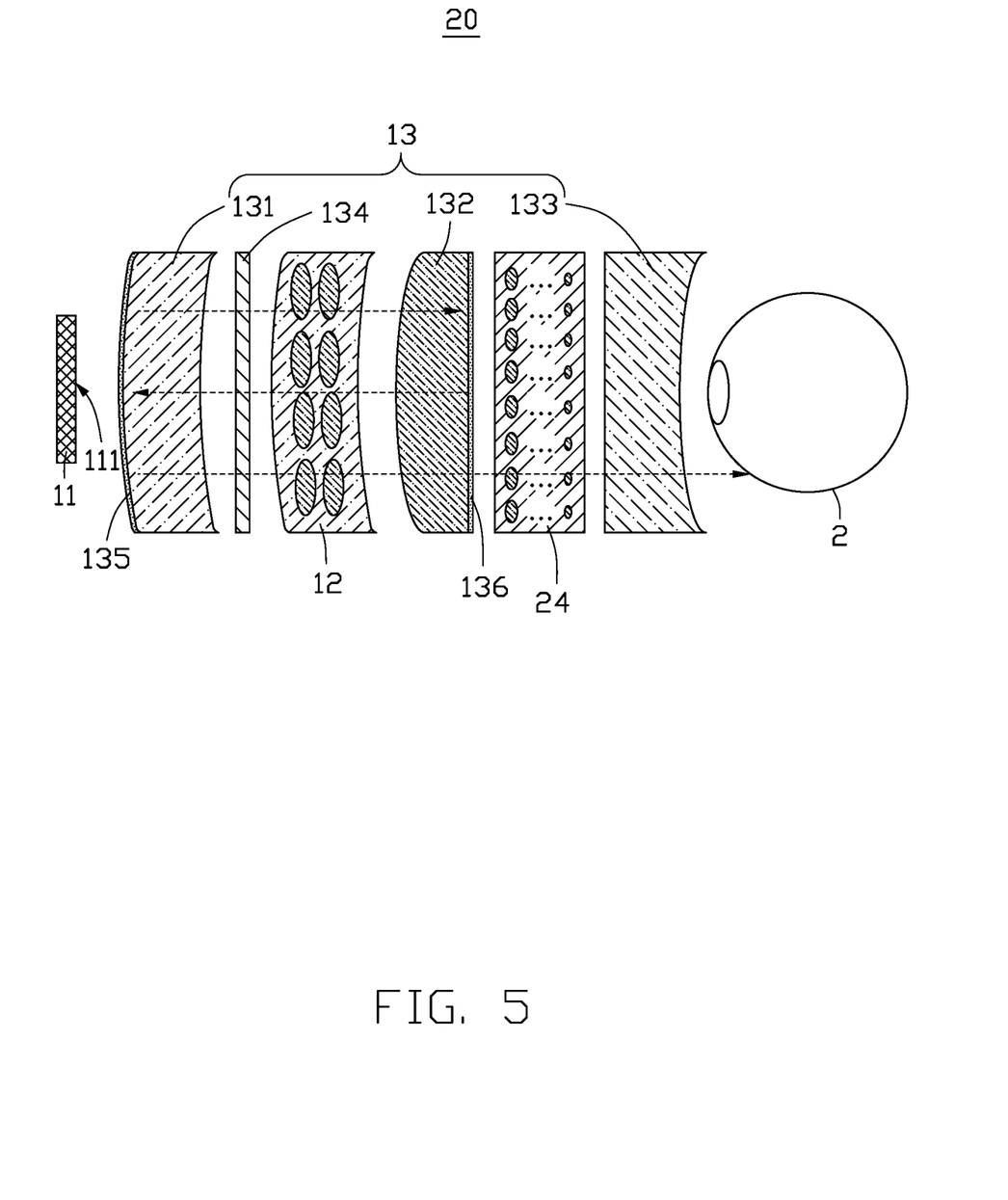
FIG. 5 shows an optical path of a VR display system of a second embodiment of the present disclosure.

The head-mounted display apparatus 1 of this embodiment is basically the same as the head-mounted display device 1 of the first embodiment; a main difference between the head-mounted display apparatus 1 of this embodiment and the head-mounted display device 1 of the first embodiment is that structures of the polarizing element of the VR display systems are different.

Figure 6:
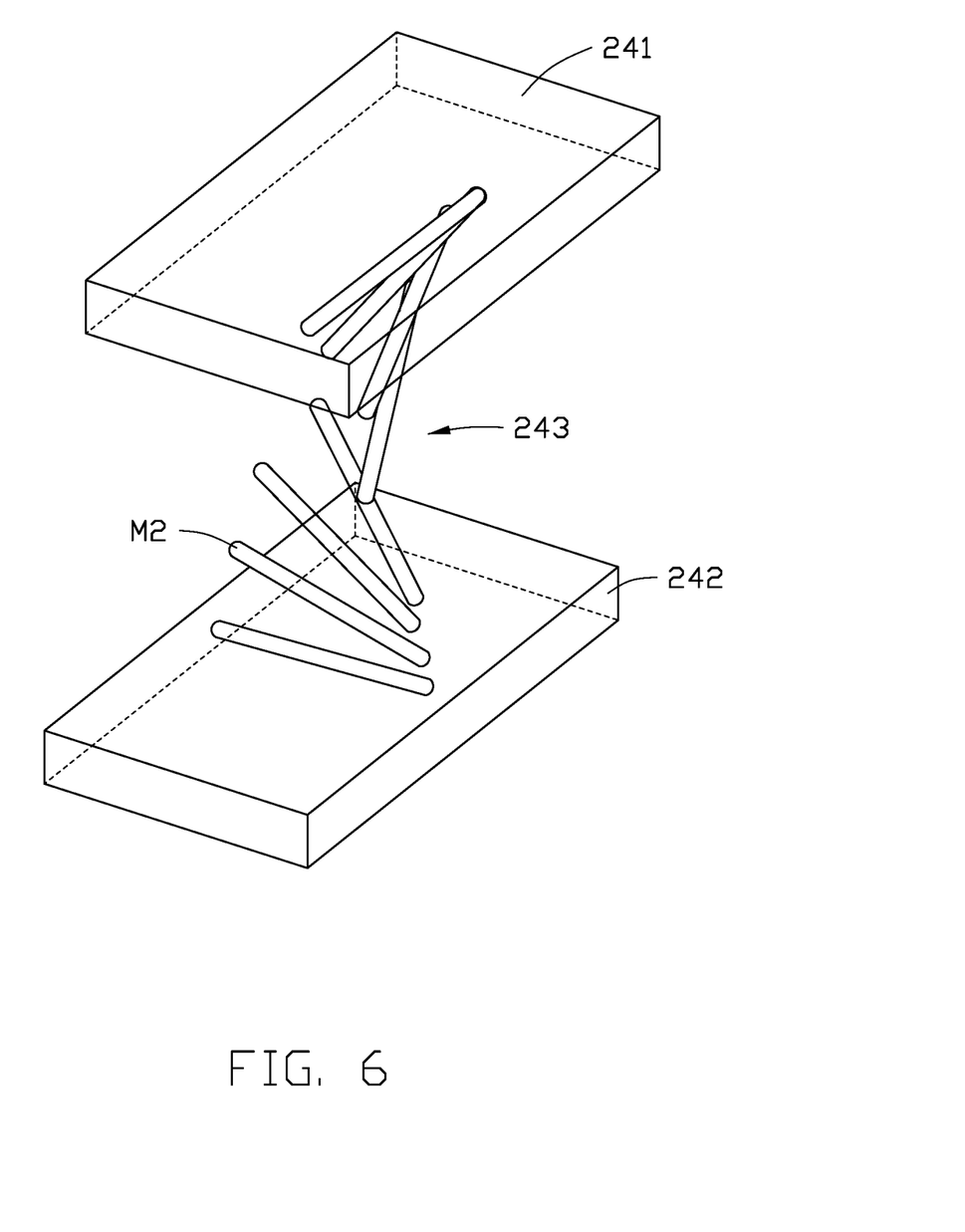
FIG. 6 shows a structure of an unpowered liquid crystal layer.
Figure 7:
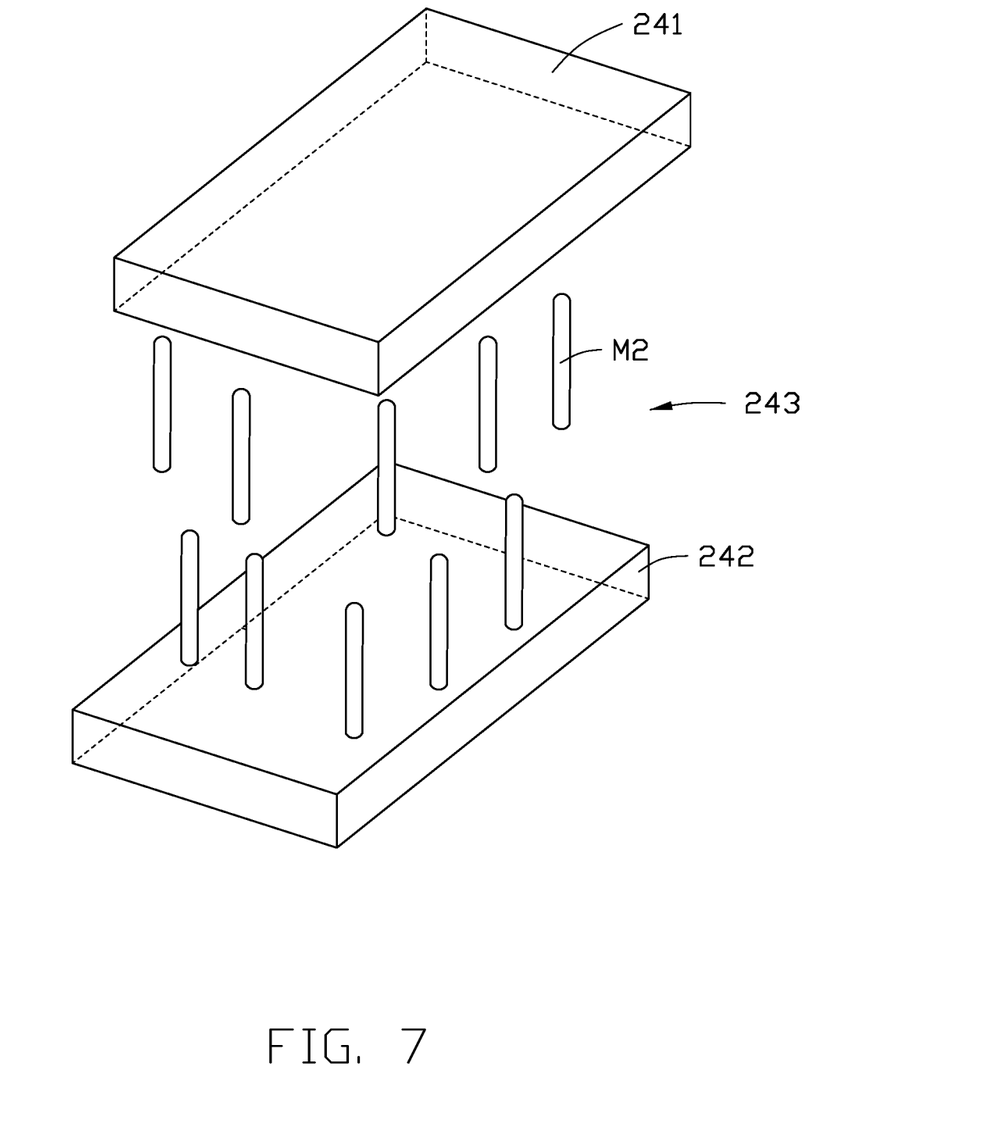
FIG. 7 shows a structure of the liquid crystal layer when powered.

As shown in FIGS. 5 and 6, in this embodiment, the polarizing element 24 in the VR display system 20 includes a third electrode layer 241, a fourth electrode layer 242, and a second liquid crystal layer 243. The third electrode layer 241 and the fourth electrode layer 242 are electrically connected to a drive circuit (not shown) and receive voltages from the drive circuit. The second liquid crystal layer 243 includes a plurality of liquid crystal molecules M2. Rotation angles of the liquid crystal molecules M2 in the second liquid crystal layer 243 are shown in FIG. 6, wherein the second liquid crystal layer 243 can be used as a linear polarizer. When voltages are applied to the third electrode layer 241 and the fourth electrode layer 242, the rotation angles of the liquid crystal molecules M2 in the second liquid crystal layer 243 thus become as shown in FIG. 7, wherein the second liquid crystal layer 243 can be used as a linear polarizer.

In this embodiment, the rotation angles of the liquid crystal molecules M2 in the second liquid crystal layer 243 of the two VR display systems 20 in the head-mounted display apparatus 1 are different. That is, the liquid crystal molecules M2 in the second liquid crystal layer 243 of one VR display system 20 are as shown in FIG. 6, and the liquid crystal molecules M2 in the second liquid crystal layer 243 of the other VR display system 20 are as shown in FIG. 7. Therefore, the polarization directions of the image light from the two VR display systems 20 are different, that is, the polarization directions of the image light incident on the left and right eyes of the users are different, and the head-mounted display apparatus 2 can again display a three-dimensional VR image to the users.

Figure 8:
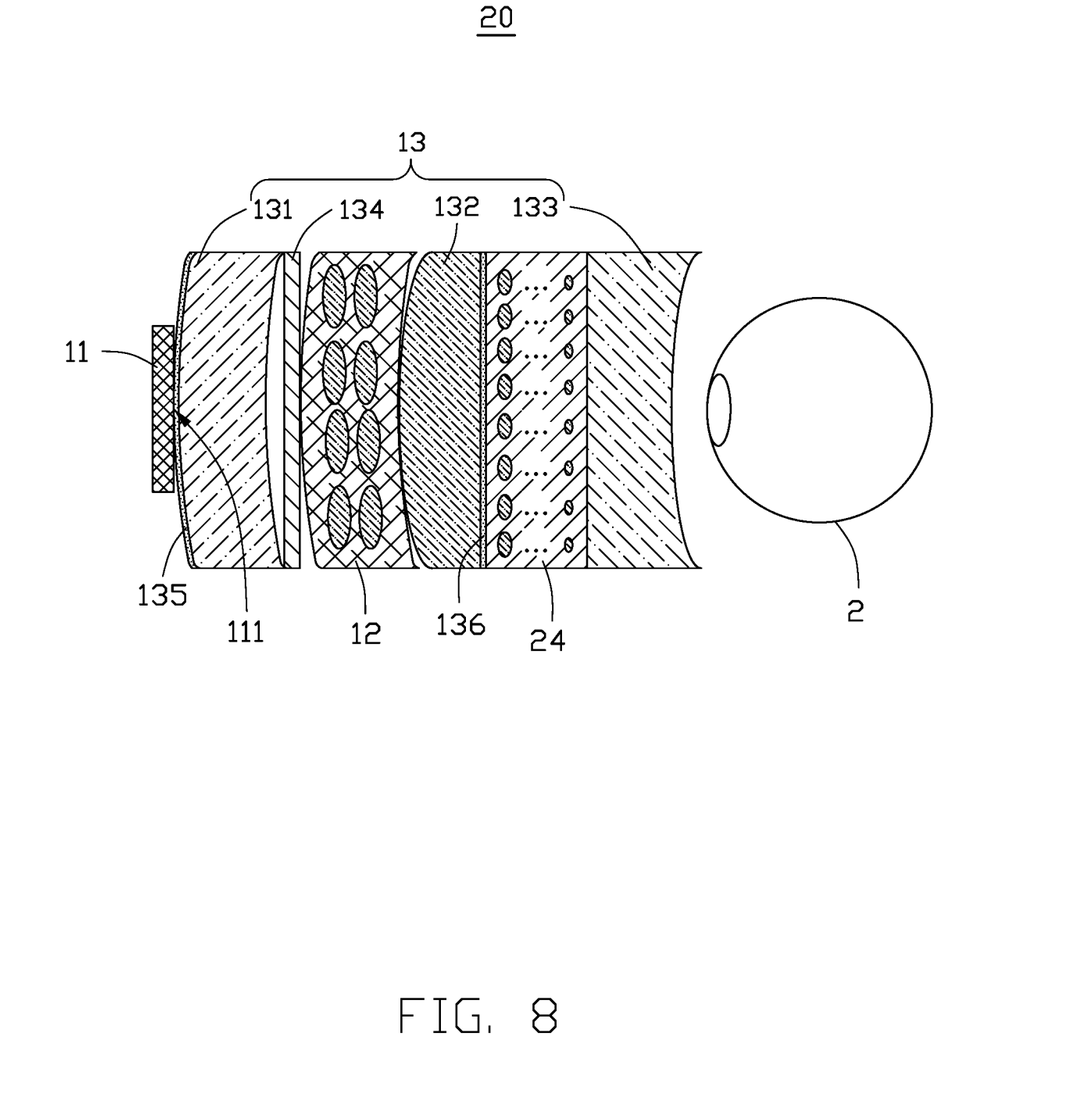
FIG. 8 shows a structure of the VR display system of the second embodiment of the present disclosure.

A structure of the VR display system 20 of this embodiment is shown in FIG. 8. In a manufacturing process, the lens 131 coated with the semi-reflective and semi-transparent coating 135 is bonded to the wave plate 134, the lens 132 coated with the polarizing reflection film 136 is bonded to the focusing structure 12, the wave plate 134 is bonded to the focusing structure 12, the liquid crystal element is poured into a space between the lenses 132 and 133 to form the polarizing element 24, and finally the filling channel is sealed with UV glue and cured with light.

The head-mounted display apparatus and the VR display system 20 of this embodiment can achieve all the beneficial effects of the head-mounted display apparatus 1 and the VR display system 10 in the first embodiment. Applicability of the polarizing element 24 is increased because of the polarizing element 24 including the second liquid crystal layer 243 and a transmission rule (the polarization and direction of image light being transmitted) of the polarizing element 24 to the image light being adjustable.

The embodiments shown and described above are only examples. Many details are often found in the art such as the other features of a light-emitting assembly and a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A head-mounted display apparatus comprising two virtual reality display systems, each of the two virtual reality display systems comprising:
   a display device for emitting image light; and
   a focusing structure on an optical path of the image light, the focusing structure comprising a first electrode layer, a second electrode layer, and a first liquid crystal layer between the first electrode layer and the second electrode layer, the first liquid crystal layer being configured to focus the image light according to voltages of the first electrode layer and the second electrode layer, the focused image light displaying virtual reality images;
   wherein, optical paths of the image light emitted from the two virtual reality display systems are independent from each other, each of the two virtual reality display systems further comprise a polarization element on the optical path of the image light, the polizarization element is configured to transmit a part of the image light and filter out another part of the image light, polarization directions of the polarization elements in the two virtual reality display systems are different.

2. The head-mounted display apparatus of claim 1, wherein each of the two virtual reality display systems further comprise an enlargement assembly on the optical path of the image light, the enlargement assembly is configured to guide the image light in the enlargement assembly back and forth by converting polarization states of the image light, thereby extending the optical path of the image light and enlarging the virtual reality images.

3. The head-mounted display apparatus of claim 2, wherein the enlargement assembly comprises:
   a lens group comprising a plurality of lens, the plurality of lens being configured to focus the image light; and
   a wave plate between the plurality of lens, the wave plate being configured to guide the image light in the enlargement assembly back and forth by converting the polarization states of the image light.

4. The head-mounted display apparatus of claim 3, wherein the image light from the display device is circularly polarized light, the wave plate is configured to convert the image light into linearly polarized light, and the focus structure is configured to receive the image light from the wave plate.

5. The head-mounted display apparatus of claim 1, wherein the polarization element is a linear polarizer.

6. The head-mounted display apparatus of claim 1, wherein the polarization element comprises a third electrode layer, a fourth electrode layer, and a second liquid crystal layer between the third electrode layer and the fourth electrode layer;
   the second liquid crystal layer is configured to control a part of the image light having a preset polarization direction to transmit from the polarization element according to voltages of the third electrode layer and the fourth electrode layer.

7. The head-mounted display apparatus of claim 6, wherein polarization directions of the image light transmitted by the second liquid crystal layer in the two virtual reality display systems are different at the same time.

8. The head-mounted display apparatus of claim 1, wherein the first electrode layer is conductive and continuous sheet-like, and the second electrode layer is conductive and is sheet-like with a through hole in a central region.

9. The virtual reality display system of claim 8, wherein the first electrode layer is on a light exiting side of the focusing structure, and the second electrode layer is on a light entrance side of the focusing structure.

* * * * *